Figure 1:
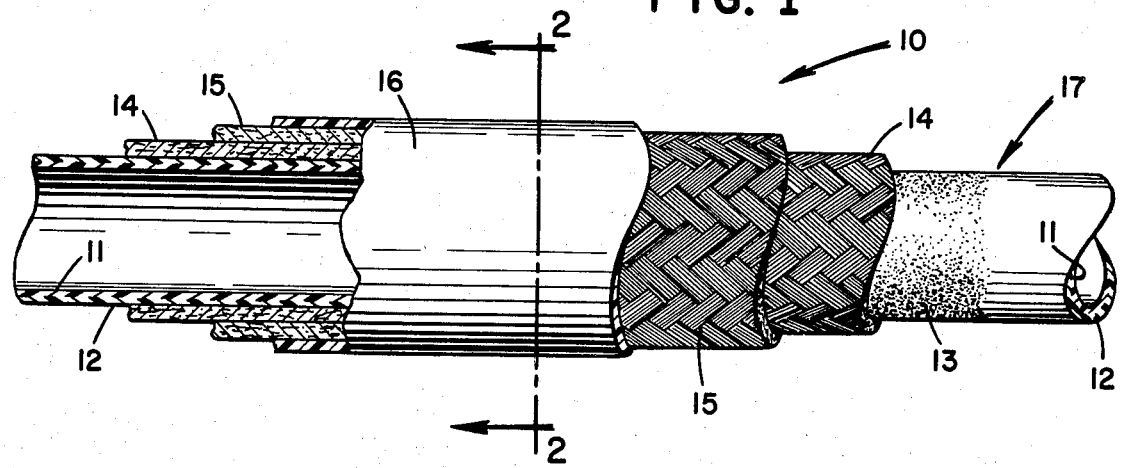

United States Patent [19]

Johansen et al.

[11] 4,303,457
[45] Dec. 1, 1981

[54] METHOD OF MAKING A SEMI-CONDUCTIVE PAINT HOSE

[75] Inventors: Hans A. Johansen; Larry R. Phillippi; Edward A. Green, all of Mantua, Ohio

[73] Assignee: Eaton Corporation, Cleveland, Ohio

[21] Appl. No.: 49,689

[22] Filed: Jun. 18, 1979

Related U.S. Application Data

[60] Division of Ser. No. 620,189, Oct. 6, 1975, abandoned, which is a continuation-in-part of Ser. No. 598,537, Jul. 23, 1975, abandoned, and a continuation-in-part of Ser. No. 469,611, May 13, 1974, abandoned.

[51] Int. Cl.³ .............................................. B29D 23/05
[52] U.S. Cl. .................................... 156/149; 138/123; 138/125; 138/137; 156/244.13; 174/102 SC; 361/215
[58] Field of Search ............. 156/47, 51, 149, 244.13; 174/2, 34, 47, 102 C, 102 SC; 361/212, 215, 222; 428/922

[56] References Cited

U.S. PATENT DOCUMENTS

| | | | |
|---|---|---|---|
| 2,446,387 | 8/1948 | Peterson | 174/102 SC |
| 2,645,249 | 7/1953 | Davis et al. | 264/173 |
| 3,042,737 | 7/1962 | Brumbach et al. | 156/149 |
| 3,062,241 | 11/1962 | Brumbach | 138/137 |
| 3,290,426 | 12/1966 | Barrentine | 138/103 |
| 3,561,493 | 2/1971 | Maillard et al. | 138/137 |
| 3,576,387 | 4/1971 | Derby | 156/51 |
| 3,716,612 | 2/1973 | Schrenk et al. | 264/173 |
| 3,722,550 | 3/1973 | Matthews | 138/137 |
| 3,735,025 | 5/1973 | Ling et al. | 174/102 SC |
| 3,769,085 | 10/1973 | Matsubara | 156/51 |
| 3,805,848 | 4/1974 | Chrow | 138/137 |
| 3,828,112 | 8/1974 | Johansen et al. | 138/127 |
| 3,861,973 | 1/1975 | Koch | 156/149 |
| 3,905,398 | 9/1975 | Johansen et al. | 138/125 |
| 3,963,856 | 6/1976 | Carlson et al. | 361/215 |
| 4,059,847 | 11/1977 | Phillips et al. | 156/149 |
| 4,143,238 | 3/1979 | Sheth | 174/102 SC |

FOREIGN PATENT DOCUMENTS 2103394 8/1972 Fed. Rep. of Germany ...... 138/103

Primary Examiner—Caleb Weston
Attorney, Agent, or Firm—R. J. McCloskey; A. E. Chrow

[57] ABSTRACT

A composite reinforced hose for conveying paint under pressure is provided with a core tube simultaneously coextruded from two or more thermoplastic synthetic polymers which are in intimate contact with each other. The inner layer of the core tube is nylon or other chemical resistant polymer which is substantially non-conductive and the outer layer is electrically conductive. The conductive polymer layer serves as a ground for static electricity.

11 Claims, 2 Drawing Figures

METHOD OF MAKING A SEMI-CONDUCTIVE PAINT HOSE

This application is a division of application Ser. No. 620,189 filed Oct. 6, 1975, which is a continuation-in-part of application Ser. No. 598,537 filed July 23, 1975 now abandoned, and copending application Ser. No. 469,611 filed May 13, 1974, now abandoned.

This invention relates generally to composite tubing and more particularly to a hose for transmitting fluids under pressure in a spraying apparatus such as a paint spray.

Apparatus for spraying liquids such as paint is provided with a pump and hose assembly for transmitting liquid under pressure from a supply tank to a spray gun nozzle. An electrically conductive ground wire is usually included throughout the length of the hose to drain off any static electricity developed at the spray nozzle of the hose to prevent sparking when it approaches a conductor such as a steel beam or the like. A hose having a flexible polymeric core tube, fibrous reinforcing material wound about the core tube and a protective sheath is used to convey the liquid at a pressure which is sufficently high to produce a spray. The hose must be capable of expanding radially under the pulsation of the pump in order to act as an accumulator which attentuates the pulses so as to minimize pulsating at the nozzle and thereby produce a relatively smooth and uniform spray of liquid. On electric motor operated paint spray systems, the accumulator action also retards the rate of pressure change affecting the motor controlling pressure switch, thereby reducing the number of stops and starts of the motor controlling the fluid pump.

It has been proposed heretofore to wind a ground wire about the core tube as one of the braids of the reinforcing layer. However, the wire frequently broke under pressure and the abrasion of the braid by the wire sometimes resulted in bursting of the hose.

It is proposed in U.S. Pat. Nos. 3,445,583, 3,543,803 and 3,780,208 to provide hoses for transmitting liquids from a pulsating source with a ground wire helically wound about the core tube and enclosed within a rupture resistant sleeve.

While the disclosed hoses have been found to be adapted for successfully transmitting paints under most conditions, the inclusion of a grounding wire enclosed in a plastic sleeve introduces additional steps in the manufacture of the hose and it has been found in practice that the ground wire sometimes ruptures and the fragments are not confined sufficiently to maintain continuity of the static discharge system. Also, the fragments may penetrate the core or sheath causing a premature failure of the hose.

It is therefore an object of this invention to provide an improved composite hose having a means for static discharge. Another object of the invention is to provide a composite hose for use with a paint spraying apparatus or the like which is adapted for transmission of pulsating fluids and has a static discharge means which is conveniently incorporated in the hose and effectively discharges static electricity throughout the life of the hose. A further object of the invention is to provide a composite hose with a grounding means coextensive with the length of the hose which is not ruptured or otherwise broken by the pulsating action of the hose.

Figure 2:
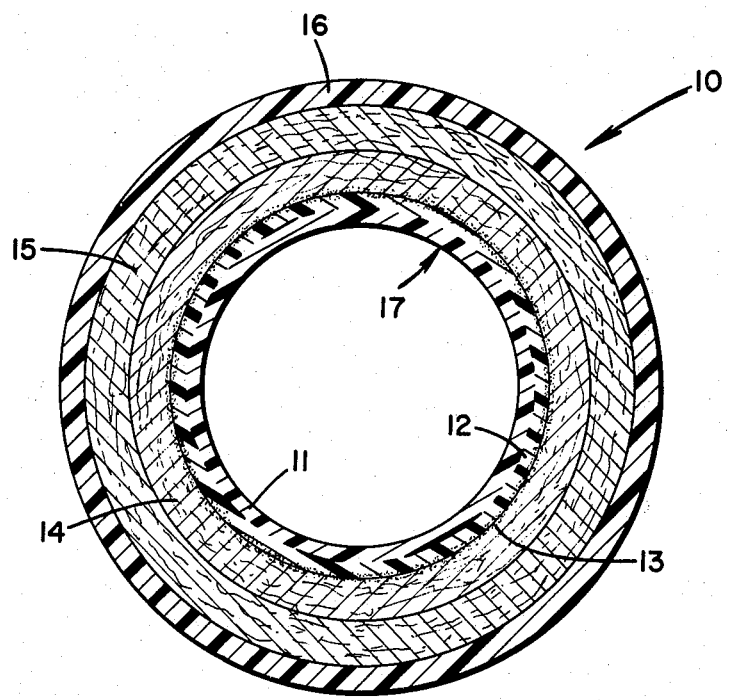

Other objects will become apparent from the following description with reference to the accompanying drawing wherein:

FIG. 1 is a cut-away side elevation, partially in section, of one embodiment of the invention; and FIG. 2 is a cross-section taken along the line 2—2 of FIG. 1.

The foregoing objects and others are accomplished in accordance with this invention, generally speaking, by providing a composite reinforced paint hose having a core tube shaped from two layers of synthetic thermoplastic resin which are in intimate contact with each other with the outer layer of the tube wall being a semi-conductive material, one or more layers of a fibrous reinforcing material disposed about the core tube and a protective synthetic resinous sheath disposed about the fibrous reinforcing material. The composite core tube has an inner wall adapted to resist chemical attack by the fluid conveyed by the hose while the coextensive outer layer of the core tube serves as a means for conducting any static electricity along the length of the hose to a suitable ground wire. The invention thus provides a flexible paint hose having a synthetic resinous core tube, a fibrous reinforcing layer about the core tube, a protective sheath about the fibrous layer and a grounding means forming an integral part of the wall of the core tube. Although the laminated core tube may be formed by spraying the inner layer with a conductive coating or by dipping the inner layer in a conductive resin, the core tube is preferably formed by coaxially extruding two different extrudable synthetic polymers to provide a flexible tube having a wall of two synthetic resinous layers. The two layers may be extruded in two separate extrusion steps or they may be simultaneously coextruded so that the layers are melt fused together. The conductive layer extends throughout the entire length of the hose and is in electrical contact with a grounded hose fitting. The grounding layer is a synthetic polymer which is semiconductive, i.e. it exhibits a volume resistivity of $10^9$ ohm-cm or less.

In airless paint spraying processes, it is undesirable to accumulate more than 1400 static volts at the spray gun of the spraying apparatus because of the danger of igniting the air-solvent mixture about the spray gun. Preferably, a safety factor of 4:1 should be maintained which means that the static voltage on the spray end of the hose should not exceed 350 volts. The hose provided by this invention has a ground which is a semi-conductive layer of polymer which will drain off the static potential so a frightening or dangerous electrical-arc between the spray gun and ground is avoided.

Any suitable conductive synthetic polymer may be used. Preferably, the conductive synthetic polymer is one which will melt fuse to the polymer of the first layer when the two polymers are coaxially extruded. The conductive polymer must have the required electrical properties. While a semi-conductive polymer having a volume resistivity after application and other processing of as high as 100,000 ohm-cm at ambient temperature may be used, usually the volume resistivity will not be more than about 2000 ohm-cm. It is preferred to use one having a calculated volume resistivity of not more than about 500 ohm-cm. In fact, best results have been obtained so far with a polymer having a volume resistivity of 40 or less ohm-cm. The volume resistivity may be calculated by the method described in "NFPA Journal No. 77, Static Electricity, 1972." Examples of suitable polymers are ethylene-ethyl acrylate, ethylene-vinyl acrylate and thermoplastic rubber having the desired volume resistivity but it is preferred to use a polyurethane of the desired volume resistivity in hoses having a nylon inner layer where kink resistance is desirable because the polyurethane bonds well to the nylon and can be bonded to the reinforcing material.

The semi-conductive polymer may have carbon particles including graphite particles, silver particles, copper particles or other suitable electrically conductive particles dispersed substantially uniformly therein to provide the polymer with a volume resistivity within the requirements of the hose.

The invention permits the manufacture of a composite reinforced semi-conductive paint hose having some particularly desirable physical property without substantial compromise of other desirable properties combined with a means for effectively draining static electricity from the hose. For example, a substantially chemically resistant polymer such as nylon may be chosen for the inside layer of the core tube wall and a layer of a more flexible polymer such as an elastomeric polyurethane having electrically conductive particles dispersed therein may be fused thereto as the outer surface to provide improved flexibility, kink resistance and means for preventing sparking of static electricity at the nozzle of the hose. The outer layer containing electrically conductive particles may be shaped from a resin such as a polyurethane which can be solvated with a polar solvent to adhesively bond the core tube to the adjacent layer of reinforcing material and to improve the strength of the hose. In such a hose, the relative thickness of the nylon and conductive polyurethane layers may be varied to further modify the properties of the hose.

The core tube may be fabricated by any suitable simultaneous coaxial extrusion process which will produce melt fusion of two different layers of synthetic thermoplastic resins together to the extent that the two layers will not separate at the interface under elongation and other conditions to which the hose will be exposed. The most practical method of making the core tube is to supply two different synthetic thermoplastic resins or two different types of the same thermoplastic resin to a single extrusion head from different extruders operating under conditions whereby the resin which will be the inner portion of the core tube is still molten when the molten resin for the other portion of the core tube wall is applied thereover and the two molten synthetic resins are extruded through the same extrusion die.

It has been found that two layers of selected thermoplastic synthetic resin with one being electrically conductive will melt fuse together along the interface and become so firmly bonded together that the core tube will not delaminate in a hose used to convey fluids under high pressure even if the physical properties of the two layers are significantly different. For example, nylon and a semi-conductive thermoplastic polyurethane having particles of carbon black uniformly dispersed therein will melt fuse together in accordance with the process of the invention. Hence, the invention contemplates a semi-conductive paint hose having a core tube with a layer of nylon melt fused to a layer of thermoplastic substantially non-porous polyurethane. Usually, the nylon layer will be the innermost layer because of its chemical resistance. The semi-conductive polyurethane layer imparts flexibility to the hose and may also be used for making an adhesive to bond the core tube to the fibrous reinforcing layer so it is usually disposed on the outside of the core tube.

The invention also provides composite reinforced hoses having a core tube of two or more layers of synthetic resin of the same general chemical composition but modified to provide different physical properties. For example, a relatively hard thermoplastic polyurethane having a hardness of Shore D 50 to 60 and a relatively soft thermoplastic polyurethane having a hardness of Shore A 80 to 95 may be coextruded to form a core tube. The harder thermoplastic polyurethane has better chemical resistance than the softer one so the harder one is usually the inner layer of the core tube while the softer one contains particles of an electrical conductor and is the outer layer. The presence of the layer of softer polyurethane improves the flexibility of the hose as well as providing a semi-conductor for static electricity.

Other combinations of synthetic resins which may be co-axially extruded simultaneously or in tandem to form a core tube having two or more layers are those disclosed in our application Ser. No. 598,537. For example, segmented co-polyesters such as "Hytrel" as one layer and a polyvinyl chloride compound for the conductive layer. A segmented co-polyester may be used for one layer and a conductive substantially non-porous thermoplastic polyurethane as the other layer. A mechanical mixture of an aromatic polyester such as poly(tetramethylene terephthalate) and a segmented co-polyester may be used as one layer and a conductive polyvinyl chloride polymer as the outer layer. The laminated core tubes combining a layer of "Hytrel" or a mixture of a segmented co-polyester and an aromatic polyester and a layer of polyvinyl chloride compound or polyurethane will usually have the layer containing the segmented co-polyester on the inside as the non-conductive layer. A mechanical mixture of segmented co-polyester and polyurethane may also be used for one of the layers, usually the outer layer. The inner layer of the core tube may be a mixture containing from about 5 to about 95% by weight polyurethane and 95 to 5% by weight aromatic polyester in combination with any of the outer layers disclosed herein. The inner layer may also be a mixture of polyacetal and polyurethane in combination with any of the outer layers. In these embodiments, the outer layer contains particles which are electrically conductive.

Examples of suitable thermoplastic aromatic polyesters are "Valox", aromatic polyester sold by the General Electric Co., "Tenite", aromatic polyester sold by Eastman Kodak Co. and "Celanex", aromatic polyester sold by Celenese Plastics Co.

Any suitable relative proportions of aromatic polyester such as "Valox" and segmented co-polyester such as "Hytrel" may be used in the mixtures thereof extruded to form a layer of the core tube. For example, from about 5% to about 60% by weight aromatic polyester such as "Valox" and 95% to about 40% by weight segmented co-polyester such as "Hytrel" may be used. Any suitable mixture of polyurethane and co-segmented polyester may be used, but it is preferred to use from about 99% to about 50% thermoplastic polyurethane and 1% to about 50% by weight co-segmented polyester.

Best results have been obtained so far with a hose having a core tube with an inner nylon surface and a semi-conductive polyurethane surface so such a core tube is preferred. However, other polymers which are resistant to chemical action by the paint may be used for the inner layer such as a segmented co-polyester such as "Hytrel" sold by E.I. duPont de Nemours of Wilmington, Del.

The core tube may be adhesively bonded to the surface of the reinforcing material by the application of an adhesive material or by activating the surface of the core tube with a solvating or softening agent to form an adhesive in situ from the resin on the outer surface of the core tube. For example, a polyurethane surface of a core tube may be activated by wetting it with a suitable polar solvent such as, for example, N-methyl pyrrolidone or the like. However, it is preferred to apply an adhesive material such as a solution of polyurethane between the surface of the core tube and adjacent layer of fibrous reinforcing material because the use of a solvating agent to solvate the surface disturbs the uniformity of the distribution of electrically conductive particles and affects the electrical conductivity of the semi-conductive polymer layer. The reinforcing fibrous material is then applied under tension about the adhesively wet core tube whereby the strands of reinforcing material become embedded and partially encapsulated by the adhesive. In this way, the fibrous reinforcing layer becomes bonded to the core tube and the strength of the hose is improved.

It has been found that simultaneously coextruded properly selected synthetic thermoplastic polymers will become bonded together by melt fusion even though one of the polymers contains particles of electrically conductive material and that an intermediate adhesive is not necessary. For example, nylon will fuse to a thermoplastic elastomeric polyurethane containing carbon black particles if the two molten synthetic polymers are fed separately to an extrusion head and coextruded one over the other while still molten. In those instances where one layer of the core tube is difficult to melt fuse to another layer, an intermediate layer of a third synthetic resin which will melt fuse to both layers may be interposed therebetween but it is preferred to melt fuse the semi-conductive layer directly to the inner layer of the core tube.

Referring now to the drawing, a semi-conductive paint hose 10 having a core tube I.D. of 0.25 inch is illustrated in FIGS. 1 and 2. Composite hose 10 has a core tube 17 formed by the simultaneous coaxial extrusion of a layer of nylon 11 about 0.025 inch thick and a semi-conductive thermoplastic elastomeric polyurethane outer layer 12 about 0.015 inch thick and containing carbon particles and having a volume resistivity at room temperature (about 20° C.) of about 100 ohm-cm. The two synthetic resins become fused together at the interface to form a core tube 17 which will not delaminate when the hose 10 is used for conveying a paint under pulsating pressure. The outer surface of polyurethane of core tube 17 is wet with an adhesive solution 13 of a polyurethane in N-methyl pyrrolidone. A reinforcing layer 14 of nylon filaments is braided under tension around the core tube while the adhesive on the surface of core tube 17 is wet. The filaments become bonded to the surface of the core tube 17 forming an elastomeric bond of the fibrous reinforcing material with the core tube. A second reinforcing layer 15 of poly(ethylene terephthalate)ester is braided over layer 14. A protective polyurethane sheath 16 about 0.025 inch thick is extruded over fibrous reinforcing layer 15 by extrusion of a thermoplastic elastomeric polyurethane thereover. Sheath 16 may be adhesively bonded to the surface of layer 15.

Any other core tube similar to those disclosed as suitable herein may be substituted in the foregoing embodiment of the invention for core tube 17 and the core tube 17 may or may not be bonded to the reinforcing layer depending upon the particular requirements of the hose.

The polyurethane layer 12 of core tube 17 may be extruded from any suitable thermoplastic polyurethane such as the one sold under the trademark "Pellethane" by the Upjohn Company. The polyurethane disclosed in U.S. Pat. Nos. 3,116,760 and 3,722,550 and disclosed in the book by Saunders and Frisch, entitled "Polyurethanes: Chemistry and Technology", published by Interscience Publishers, copyright 1964 may also be used. Reaction products of poly(tetramethylene etherglycol, suitable chain extender such as 1,4-butane diol, and 4,4'-diphenylmethane diisocyanate and polyurethanes prepared by reacting an inner ester such as poly(e-caprolactone)ester and a suitable chain extender such as 1,4-butane diol with an aromatic diisocyanate such as 4,4'-diphenylmethane diisocyanate are preferred. The sheath 16 may also be extruded from any other suitable synthetic resin such as, for example, nylon in some embodiments of the invention.

The fibrous reinforcing material may be formed by braiding filaments or by helically winding strands of filaments of any suitable synthetic resinous material, such as, for example, a poly(alkylene terephthalate)ester, nylon, aromatic polyamide or the like or combinations thereof. Suitable nylon fibrous reinforcing material is disclosed in U.S. Pat. No. 3,334,164 while suitable poly(alkylene terephthalate)ester fibrous reinforcing material is disclosed in U.S. Pat. No. 3,062,241. Such fibers have a tenacity of about 7 to about 11 grams per denier and an elongation at break of about 9% to about 17%. In one embodiment of the invention, the hose may be provided with a reinforcing layer of braided or helically wound filaments having a tenacity of at least 13 grams per denier and up to about 25 grams per denier and an elongation at break of from about 2% to about 7% such as the aromatic polyamide fiber marketed by E.I. duPont de Nemours & Co. under the trademark "Kevlar". Suitable reinforcing material containing synthetic aromatic polyamide filaments is disclosed in our copending application Ser. No. 463,371 filed Apr. 23, 1974. A fibrous reinforcing material of aromatic polyamide fibers may be used to advantage in composite hoses having a high burst strength.

The core tube can be shaped by extrusion with any suitable extrusion apparatus having a separate extruder for feeding each synthetic thermoplastic resin to a single extrusion head.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A method of making a flexible electrically conductive hose for the conveyance of fluids under pressure comprising a flexible composite core tube, a fibrous reinforcing material disposed about the core tube and a protective sheath disposed about the fibrous reinforcing material, said hose having improved resistance to rupture from pulsating fluids as a result of said core tube utilizing a flexible electrically conductive synthetic polymeric material having a volume resistivity adapted to provide the sole means by which the hose conducts static electricity to ground; the method comprising the steps of:

(a) extruding a flexible tubular shaped inner layer from a substantially nonconductive synthetic polymeric material having physical and chemical resistance characteristics suitable for the conveyance of the fluids therethrough;

(b) providing the composite core tube by extruding a tubular shaped electrically conductive outer layer about the inner layer of step (a) and in intimate contact therewith, said outer layer comprising a flexible synthetic polymeric material containing an amount of electrically conductive particles dispersed substantially uniformly therein to provide a volume of resistivity suitably adapted to provide the sole means by which the hose conducts static electricity to ground;

(c) providing a fibrous reinforcement about the outer layer of the composite core tube provided by Step (b); and (d) providing a protective sheath about the fibrous reinforcement provided by Step (c).

2. The method of claim 1 wherein the outer layer of Step (b) is simultaneously coextruded about the inner layer during the extrusion process of Step (a).

3. The method of claim 1 or 2 wherein the outer layer is melt fused to the inner layer provided by Step (a) during the extrusion process of Step (b).

4. The method of claim 1 further incorporating a means by which the reinforcement is bonded to the outer layer of the composite core tube during the process of Step (c).

5. The method of claim 4 wherein the bonding means is provided by the fiber adjacent the outer layer of the composite core tube being embedded therein as a result of solvating the outer surface of the said outer layer.

6. The method of claim 1 wherein the outer protective sheath of Step (d) is provided by extruding a synthetic polymeric material about the fibrous reinforcement provided by Step (c).

7. The method of claim 1 further incorporating means of bonding the outer protective sheath to the reinforcement material during the process of Step (d).

8. The method of claim 1 wherein the synthetic polymer material of the inner layer of the composite core tube is a nylon and the outer layer of the composite core tube is a polyurethane.

9. The method of claim 1 wherein the electrically conductive particles are carbon particles.

10. The method of claim 1 wherein the volume resistivity of the electrically conductive outer layer is not more than about $10^9$ ohm-cm.

11. The method of claim 1 wherein the volume resistivity of the electrically conductive outer layer of the composite core tube is not more than about 2000 ohm-cm.

* * * * *